(12) United States Patent
Kirla

(10) Patent No.: US 6,816,592 B1
(45) Date of Patent: Nov. 9, 2004

(54) ECHO CANCELLATION IN DIGITAL DATA TRANSMISSION SYSTEM

(75) Inventor: Olli Kirla, Espoo (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/700,334

(22) PCT Filed: May 12, 1999

(86) PCT No.: PCT/FI99/00414
§ 371 (c)(1),
(2), (4) Date: Nov. 14, 2000

(87) PCT Pub. No.: WO99/60720
PCT Pub. Date: Nov. 25, 1999

(30) Foreign Application Priority Data

May 15, 1998 (FI) .................................................. 981091

(51) Int. Cl.$^7$ .............................................. H04M 9/08
(52) U.S. Cl. ........................... 379/406.05; 379/406.06; 379/406.08; 370/289; 370/290
(58) Field of Search ..................... 379/406.01, 406.03, 379/406.05, 406.06, 406.08; 370/286, 289, 260

(56) References Cited

U.S. PATENT DOCUMENTS

| | | | | |
|---|---|---|---|---|
| 4,995,031 A | * | 2/1991 | Aly et al. ................... 370/286 |
| 5,307,405 A | * | 4/1994 | Sih ........................ 379/406.08 |
| 5,311,558 A | * | 5/1994 | Bergmans ................... 375/346 |
| 5,313,498 A | | 5/1994 | Sano ........................... 375/103 |
| 5,559,881 A | * | 9/1996 | Sih ........................ 379/406.08 |
| 5,606,550 A | | 2/1997 | Jangi ........................... 370/289 |
| 5,646,991 A | * | 7/1997 | Sih ........................ 379/406.08 |
| 5,687,229 A | * | 11/1997 | Sih ........................ 379/406.09 |
| 6,160,886 A | * | 12/2000 | Romesburg et al. ... 379/406.05 |
| 6,570,985 B1 | * | 5/2003 | Romesburg ............ 379/406.08 |
| 6,574,336 B1 | * | 6/2003 | Kirla ..................... 379/406.01 |
| 6,665,402 B1 | * | 12/2003 | Yue et al. .............. 379/406.04 |

FOREIGN PATENT DOCUMENTS

| | | |
|---|---|---|
| EP | 0 667 687 | 8/1995 |
| GB | 2 287 626 | 9/1995 |
| GB | 2 330 745 | 4/1999 |
| WO | WO 98/06185 | 2/1998 |

* cited by examiner

Primary Examiner—Binh Tieu
(74) Attorney, Agent, or Firm—Pillsbury Winthrop LLP

(57) ABSTRACT

A method and an apparatus for echo cancellation in a digital data transmission system in which system the end of a transmission link to which sound returns as an echo is the far end and the end of the transmission link from which an echo is reflected back is the near end, and in which a speech coding method is used on the echo path at least for a far-end signal transmitted from the far end to the near end, the method comprising the following steps: the echo originating from the near end is estimated with an adaptive linear filter on the basis of the far-end signal, and the echo estimate is subtracted from the near-end signal transmitted from the near end to the far end, whereby the speech-encoded far-end signal is decoded in an echo canceller, and the echo originating from the near end is estimated on the basis of said decoded far-end signal.

24 Claims, 5 Drawing Sheets

ECHO CANCELLATION IN DIGITAL DATA TRANSMISSION SYSTEM

This application is the national phase of international application PCT/FI99/00414 filed May 12, 1999 which designated the U.S.

BACKGROUND OF THE INVENTION

The invention relates to a method for echo cancellation in a digital data transmission system, in which system the end of the transmission link to which sound returns as an echo is the far end and the end of the transmission link from which an echo is reflected back is the near end, and in which a speech coding method is used on the echo path at least for a far-end signal transmitted from the far end to the near end, the method comprising the following steps: estimating the echo originating from the near end with an adaptive linear filter on the basis of the far-end signal and subtracting the echo estimate from the near-end signal transmitted from the near end to the far end.

In bi-directional data transmission networks, such as the telephone network, an echo occurs caused by the reflection of the speaker's own voice back from certain elements of the data transmission network. The echo is interfering, if there is a delay in the transmission link. A delay is usually caused by a propagation delay or digital processing of a signal.

The echo occurring in data transmission networks can be divided into two types: electric and acoustic echo. An electric echo is generated in transmission systems of transmission and reception directions of a link, such as the hybrid circuits of a telephone network (2-conductor-4-conductor converters). An acoustic echo is generated in a terminal in such a manner that the signal from the incoming transmission direction is acoustically coupled to the microphone of the transmission direction outgoing from an ear piece or loudspeaker.

In this context, the end of the transmission link to which the sound of the speaker's own voice returns as an echo is referred to as the far end, and the end of the transmission link from which the echo is reflected back is referred to as the near end.

Echo cancellers or echo suppressors are usually used to try to eliminate the echo problem. An echo canceller tries to generate an echo estimate and to cancel the echo by subtracting the echo estimate from the echo path, i.e. from the signal returning from the near end. Generally, echo estimation tries to model the impulse response of the echo path by means of an adaptive filter. In addition, non-linear processors are often used in echo cancellers to cancel the residual echo created as a result from the adaptive filtering.

An echo suppressor is usually based on comparing the power levels of a signal going out to the echo path and returning from it. If the power of the signal returning from the echo path is smaller than a certain ratio as compared to the power of the signal gone out the echo path, the transmission link returning from the echo path is disconnected so as not to let the echo through. Otherwise, the situation is interpreted as near-end speech or double speech, in which case the link can naturally not be disconnected.

Today, mainly echo cancellers are used for echo cancellation, because echo suppressors cause the following problems. Since the comparison ratio of the power levels of the far-end and near-end signals must be selected according to the worst echo situation (generally 6 dB), low level near-end speech will not get through during double speech; and although the average speech levels of the near and far end were equal, the near-end speech is occasionally cut off during double speech depending on the momentary ratio of the signal levels. Another problem is the echo during double speech. During double speech, the near-end speech gets through the echo suppressor as does the far-end echo summed to the near-end speech. The double speech echo can be reduced by attenuating the near-end and possibly also the far-end signal in the echo suppressor during double speech. However, the attenuation cannot be very strong, because it causes an interfering pumping in the speech volume.

The adaptive filters in echo suppressors use linear filters which assume that the signal returning from the echo path is both linear and time invariant (LTI, Linear Time Invariant). If this is not the case, the echo signal can be attenuated with an adaptive filter only to the extent of the linear component in the echo signal. In other words, the attenuation achieved by an adaptive filter is directly proportional to the signal-to-noise ratio of the signal returning from the echo path, i.e. inversely proportional to the non-linearity on the echo path. When the signal-to-noise ratio becomes worse, the residual echo level goes up. A non-linear processor (NLP) is often used to try to cancel this residual echo.

Data transmission networks have several sources of non-linearity. The most typical source of non-linearity in digital data transmission networks is the quantization noise generated in A/D conversion. In uniform quantization, quantization noise is, in principle, constant, whereas the signal-to-noise(distortion) ratio increases while the signal level increases. Thus, attenuation achieved on an echo signal by a linear filter is directly proportional to the momentary signal level.

In companding PCM codecs (ITU-T G.711), an analogous signal is compressed in an encoder according to a non-linear amplification curve (a or $\mu$ zenith), after which the signal is uniform-quantized. Alternatively, an analogous signal can first be uniform-quantized and then non-linear-quantized according to the a or $\mu$ zenith. Correspondingly, a compensating expansion of the compression is performed in a decoder. Typical of a companding PCM codec is that the signal-to-noise ratio remains almost constant on a rather wide dynamic range. In G.711 codecs, the signal-to-noise ratio is approximately 35 dB while the signal level (gaussian noise) varies between −5 dBm0 and −35 dBm0. However, on low signal levels below −35 dBm0, the signal-to-noise ratio behaves as in uniform quantization: when the signal level decreases, the signal-to-noise ratio decreases. It can thus be noted that at most an approximately 35-dB additional attenuation can be achieved on an echo signal by means of a linear filter. In practice, this attenuation is often smaller, because the level of the echo signal is rather low and thus the attenuation is dependent on the momentary signal level.

The noise summing to the echo signal can also be considered a source of non-linearity. So-called line noise is generated in analogous transmission systems. When using PCM links in digital data transmission systems, noise is not cumulated, as it is in analogous systems, and thus the main noise source is often acoustic background noise picked up by the microphone of the terminal. The attenuation of the echo signal achieved by linear filters decreases, if the line noise of the echo path or the background noise of the near end is louder than the quantization noise of the PCM codec.

A third source of non-linearity is a non-linear distortion generated in the loudspeaker of the near end, which can be considerable in a loudspeaker phone or hands-free phone. In such a case, the signal-to-distortion ratio of the returning acoustic echo has decreased as compared with the signal going out to the echo path, and the attenuation achieved by linear filters decreases correspondingly. International Patent Application PCT/US96/02073 discloses a method for compensating the non-linear distortion generated in the loudspeaker phone by modelling the distortion mechanism generated in the loudspeaker.

However, one of the most significant sources of non-linearity in digital data transmission networks is speech coding. Speech coding is today generally used in the air interface of digital mobile networks (e.g. GSM, US-TDMA, US-CDMA, PDC, TETRA). Similarly, several WLL (Wireless Local Loop) systems use speech coding in the air interface. In addition, the use of speech coding will become more common in circuit-switched PSTN networks (e.g. ITU-T, G.728, G.729, G.723.1). Speech coding will also become more common in packet switched networks (e.g. Internet calls, video conferences). It can also be noted that digital satellite mobile systems use or will use speech coding.

Typically, speech coding causes an at least 10-dB deterioration in the signal-to-distortion ratio as compared with the signal-to-distortion ratio of one G-711 PCM codec. If speech coding is used on the echo path, a double speech-coding is usually performed on the echo signal, because a transmission link typically uses speech coding in both transmission directions. This means that the signal-to-distortion ratio worsens further. It has been noticed in ITU-T G.113 that a non-linear distortion caused by G.728 (LD-CELP) consecutive speech codecs increases according to equation 20log(n), where n is the number of codec pairs. It can be said that the maximum additional attenuation of an echo signal achieved in practice with a linear filter is less than 20 dB depending on the speech coding method and the level of the echo signal.

Earlier, it was noted that current echo cancellation solutions based on adaptive filtering try to lessen the impact of non-linearities on the echo path by using a non-linear processor (NLP) to cancel the residual echo generated in adaptive filtering. The higher the level of residual echo, the higher the threshold of NLP must be set to cancel the residual echo. A disadvantage of the setting the threshold level higher is the higher cutting-off-probability of the near-end speech during double speech. The non-linear acoustic echo generated by a loudspeaker phone can be cancelled with the more aggressive NLP, because a full-duplex property is typically not required in loudspeaker phones.

If the cause of the non-linearity is a loud line noise on the echo path or background noise at the near end, a linear filter can at most attenuate the echo to the extent of the signal-to-noise ratio of the moment. Even though the attenuation achieved by adaptive filtering decreases and thus NLP can switch off and let the residual echo through, it is subjectively not necessarily interfering, because the uncorrelated noise of the echo signal covers the residual echo relatively effectively.

It is, however, difficult to eliminate an increase in the level of residual echo caused by a speech codec or codecs on the echo path with NLP. If the threshold level of NLP is raised, the full-duplex properties of the link suffer, because near-end speech may be cut off during double speech. It is also not possible to utilize line noise or near-end background noise-type subjective cover effect, because the level of the non-linear distortion of the speech codec typically correlates according to the signal amplitude. Thus the distortion signal that has got through NLP sounds subjectively like a distorted echo signal.

Another problem is that speech coding typically causes an additional one-directional delay of over 20 ms. In addition, digital mobile networks use channel coding and interleaving to correct the errors on the radio path. These together cause considerable additional delay in the transmission link. Typically, the one-directional transmission delay in digital mobile networks is over 80 ms. Currently, one should prepare for echo path delays of 60 ms in general in PSTN network echo cancellers. If speech coding is used on the echo path, the adaptive filter should then be at least 100 ms long, or if speech coding and a digital radio interface is used on the echo path, the length of the adaptive filter should be at least 220 ms. These requirements would considerably increase the need for computational capacity and memory in echo cancellers. Additionally, the convergence speed of the filter typically suffers and the residual noise caused by the filter itself increases. One possibility to avoid a longer adaptive filter is to use a shift register. The shift register memory can store samples going out to the echo path to the extent of a bi-directional speech coding delay and/or a radio path delay. In such a case, the length of the filter can be made shorter and chosen to correspond to the expected echo path delay variance. This approach does not, however, remove the need for additional memory for the shift register, which may in some cases be excessive as compared to the benefit achieved, such as a marginal additional echo attenuation, as opposed to a solution based on solely an echo suppressor.

Due to the above-mentioned problems, an echo canceller based on adaptive filter cannot be successively applied, if speech coding is used on the echo path. It has been suggested that an echo suppressor or distributed echo cancellation (an adaptive filter at the near end and NLP after speech coding) could be applied to acoustic echo cancellation, if the echo path has a 4-conductor link. Since the level of an acoustic echo is usually lower that an electric echo, an echo suppressor can be designed in a manner that the full-duplex properties of the link do not suffer much. One such method is disclosed in the patent application PCT/IF197/00390 of the applicant. The problem in such an approach remains that a high-level acoustic echo or an electric echo generated in a 2/4-conductor converter cannot be cancelled without affecting the double speech properties. An additional problem is that during double speech the level of the residual echo remains higher than when using an adaptive filter.

The technically most sensible solution for adaptive echo cancellation, when speech coding is used in the transmission, is to place the echo canceller at the near end. This way, the echo path does not have non-linearities caused by speech coding and an adaptive echo canceller of prior art can be used. However, this is not always possible in practice due to lack of knowledge or for cost reasons, for instance. In some cases, there is a need to centralise the near-end echo cancellers in both transmission directions in one network element to cancel the echo of both the near and the far end. In such a case, it is possible that speech coding is used in the far-end direction and this causes non-linearity on the echo path. In addition, many PC-based Internet telephones do not use an echo canceller even though the transmission delay is typically very long. A third example is acoustic echo cancellers or echo suppressors of digital mobile stations. There is a requirement in the guidelines for a certain attenuation of acoustic echo in mobile stations, but, in practice, there are mobile stations in the market, in which the acoustic echo is subjectively interfering. This may, for instance, be due to shortcomings in the standard approval for mobile stations. Finally, it can be mentioned that some WLL terminals do not have echo cancellation or the level of their echo cancellation is not in compliance with the requirements set for PSTN echo cancellers (ITU-T G.168) and it is, therefore, also necessary to have echo cancellation on the PSTN side of the WLL air interface to cancel the echo from the direction of the terminal. Thus, an apparent need exists for adaptive echo cancellation, when speech coding is used on the echo path.

BRIEF DESCRIPTION OF THE INVENTION

Thus, it is an object of the invention to develop a method to solve the above-mentioned problems. The objects of the invention are achieved by a method characterized by decoding the speech-coded signal of the far end in an echo canceller and estimating the echo originating from the near end on the basis of said decoded far-end signal.

The invention is based on reducing the impact of a non-linear distortion caused by a speech codec on the echo path in an echo canceller based on an adaptive linear filter by modelling the non-linear distortion with the local decoder.

The method of the invention provides the advantage that the reduction in the distortion level achieved by it reduces the level of the residual echo in direct proportion. The method of the invention provides the further advantage that the signal samples received in the echo canceller are transmitted from the encoder in compressed mode whereby the amount of memory required to store them in the echo canceller is considerably reduced.

According to an alternative embodiment of the invention, the echo estimate produced by the adaptive linear filter is encoded and decoded, before it is subtracted from the near-end signal, to compensate for the non-linear distortion caused by the speech coding performed on the echo path on the near-end signal. With this embodiment, a situation, in which the near-end signal is also speech-coded, and the non-linear distortion caused thereby can be taken into account.

Further, according to another alternative embodiment of the invention, said decoded signal is also fed to a second adaptive linear filter parallel to said adaptive linear filter, the output signal of the second adaptive linear filter is encoded and decoded, the thus obtained second echo estimate is subtracted from the signal to be transmitted from the near end to the far end, and either a near-end signal, from which the first echo estimate is subtracted, or a near-end signal, from which the second echo estimate is subtracted, is selected for transmitting onward to the far end. With this alternative embodiment, the achieved echo cancellation can be optimized in different situations by using two or more different parallel filtering branches.

Another object of the invention is an apparatus for echo cancellation in a digital data transmission system in which system the end of a transmission link to which sound returns as an echo is the far end and the end of the transmission link from which an echo is reflected back is the near end, and in which a speech coding method is used on the echo path at least for a far-end signal transmitted from the far end to the near end, whereby the apparatus comprises an adaptive linear filter with which an echo estimate is produced on the basis of the far-end signal and subtracted from the signal coming from the near end to cancel the echo originating form the near end, whereby the apparatus is characterized in that the apparatus also comprises a speech decoder with which the speech-encoded far-end signal is decoded and then forwarded to an adaptive linear filter for the purpose of producing an echo estimate.

By means of such an apparatus, the advantage of the method of the invention can be achieved in a simple matter.

BRIEF DESCRIPTION OF THE DRAWINGS

In the following, the invention will be described in greater detail in connection with preferred embodiments and with reference to the attached drawings in which.

DETAILED DESCRIPTION OF THE INVENTION

The present invention can be applied to any digital data transmission system in which a speech coding method is used on the radio path at least for a signal transmitted from the far end to the near end.

Figure 1:
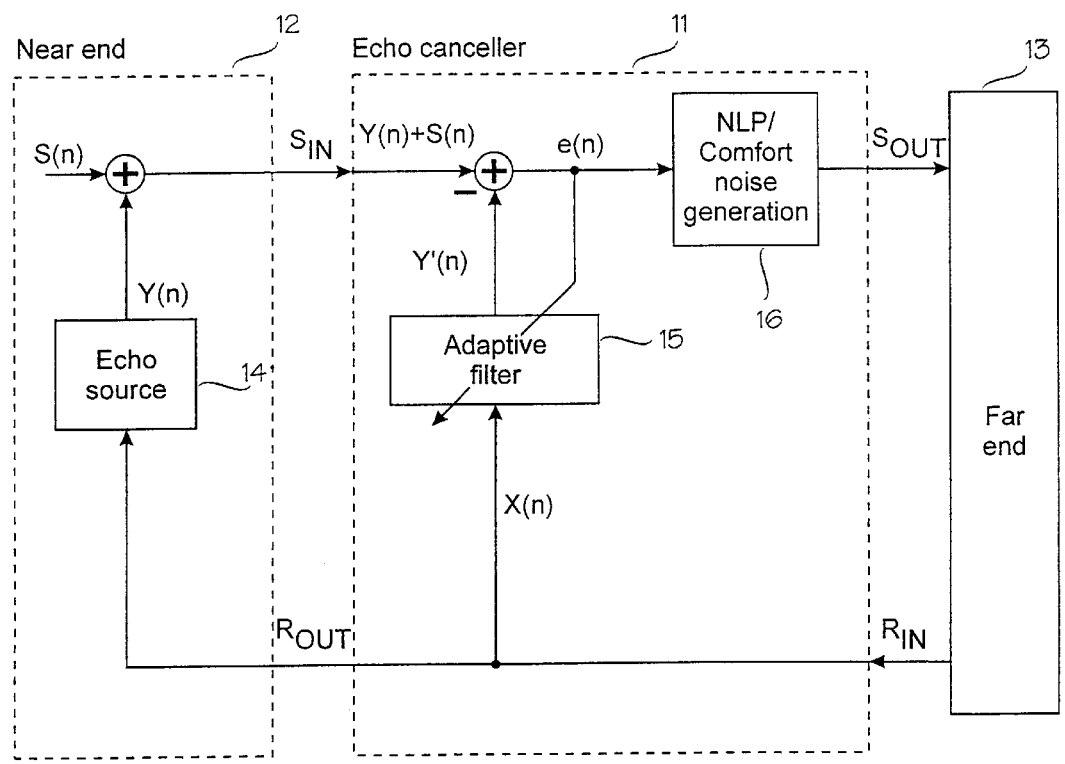
FIG. 1 shows a block diagram of prior art echo cancellation solution based on an adaptive linear filter.

FIG. 1 shows a prior art solution for adaptive echo cancellation comprising an adaptive filter 15 and also a non-linear processor (NLP)/comfort noise generator 16. The echo source 14 can be an electric echo generated in a 2/4-conductor converter, an acoustic echo coupled to a microphone from an ear piece or loudspeaker of a near-end terminal, or a composite echo formed by an electric and acoustic echo. The following abbreviations are used for the inputs and outputs of an echo canceller 11. The input of the transmission direction coming from the far end 13 is Rin (receive in) and the output is Rout (receive out). The input of the transmission direction from the near end 12 is Sin (send in) and the output is Sout (send out).

The far-end 13 speech $x(n)$ is reflected back from the echo source 14 as an echo $y(n)$ which sums to the near-end speech and/or background noise $s(n)$. This returning composite signal $y(n)+s(n)$ should be processed in the echo canceller 11 so that only the signal $s(n)$, i.e. the near-end speech/background noise, remains in the output. First an echo estimate $y'(n)$ is subtracted from the signal $y(n)+s(n)$ in an effort to cancel the echo $y(n)$. The echo estimate $y'(n)$ is obtained in the adaptive filter 15 (usually an adaptive FIR filter) by calculating the convolution between the impulse response estimate of the echo path and the near-end signal $x(n)$. The impulse response estimate of the echo path is usually calculated with the LMS (Least Mean Squares) algorithm. The remaining residual echo is usually cancelled with NLP. In addition, comfort noise is often used with NLP to cancel the disadvantageous modulation NLP causes to the near-end signal while the far end speaks, when there is background noise at the near end.

In this context, only the echo originating from the near end of the link is examined, which echo is cancelled by an echo canceller (half echo canceller) of the invention. In such a case, the echo cancellation at the far end is performed with a separate echo canceller or echo suppressor, which matter is not discussed herein.

Figure 2:
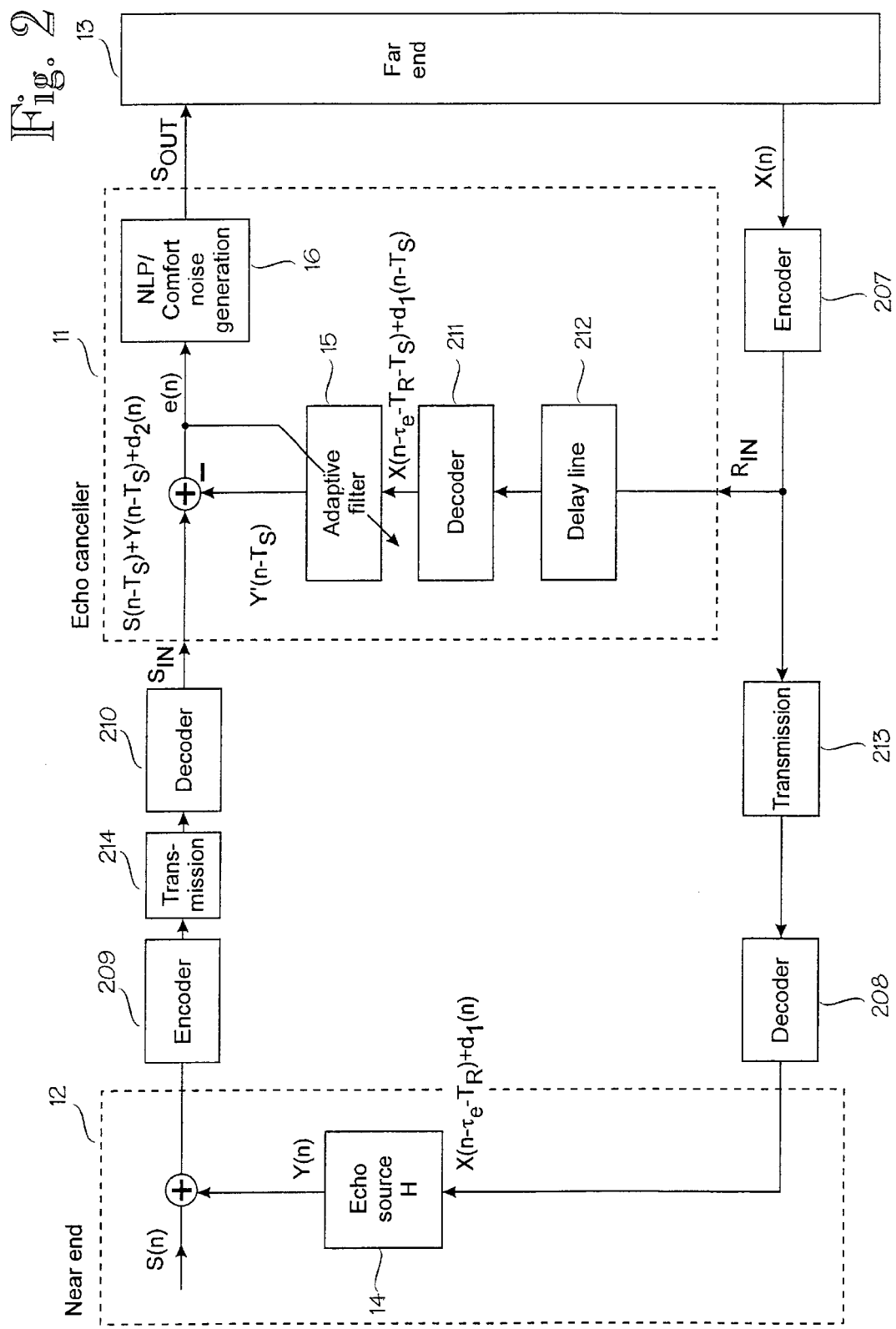
FIG. 2 shows a block diagram of an echo cancellation arrangement of a first embodiment of the invention.

FIG. 2 shows a circuit arrangement of a first embodiment of the invention. Essential for the invention presented herein is that speech coding is used between the adaptive echo canceller 11 and the terminal at the near end 12 at least for the signal going out to the echo path (encoder 207 and decoder 208). However, typically speech coding is used in both transmission directions, and the echo signal goes through two speech codecs (encoder 207—decoder 208—encoder 209—decoder 210), before it returns to the echo canceller 11. The output of encoder 207, i.e. a compressed speech signal, is brought to the input Rin of the echo canceller 11. The output of decoder 210, i.e. an uncompressed speech signal, is brought to the input Sin of the echo canceller 11 in the return direction. Between the decoder 208 and encoder 209 and the near end 12, any kind of digital and/or 2- or 4-conductor analogous transmissions are possible, which can consist of cable and/or radio links, as long as the non-linearity is not excessive in these sections. Any kind of known echo mechanism can form the echo source 14: an electric echo generated in a 2/4-conductor converter, an acoustic echo coupled to a microphone from an ear piece of loudspeaker of a near-end 12 terminal, or a composite echo formed by an electric and acoustic echo. A signal s(n), which can be near-end speech, line noise, background noise or any other interfering signal generated during transmission, is summed to the echo signal y(n) generated in the echo source 14. The delay created in block 207 is τe, in block 208 τd, in block 209 τe, in block 210 τd, in block 213 τr and in block 214 τs. Additionally, the combined delay of blocks 208 and 213 is specified as Tr and the combined delay of blocks 209, 214 and 210 is Ts.

The echo canceller 11 comprises an adaptive linear filter 15 of prior art and a NLP/comfort noise generator 16. In addition, the echo canceller 11 of the invention comprises a decoder 211 and possibly a delay line 212.

The adaptive filter 15 can be based on any linear filter known in the art and its adaptation technique which aims at minimising the residual echo y(n-Ts)-y'(n-Ts). The linear filter can either be a FIR filter or an IIR filter. The linear filter and/or adaptation method can be based on both full-band and partial-band techniques. An update of the tap coefficients of the filter can, for instance, be based on LMS, NLMS (normalised LMS) or RLS (Recursive Least Squares) algorithm or a combination of these. Any known method can be used in preventing the update of the tap coefficients of the adaptive filter 15. Update prevention is always necessary when the signal s(n) (near-end speech/background noise) suddenly increases. If the update is not prevented, the model of the echo path impulse response breaks up and the adaptive filter generates an incorrect echo estimate y'(n-Ts) and thus the attenuation achieved for the echo signal y(n-Ts) is lost.

The non-linear processor (NLP)/comfort noise generator 16 can be based on any generally known method. Typically NLP is a centre clipper in which values lower than a certain threshold level in a signal e(n) are attenuated or set to zero. The threshold level of NLP can either be fixed or adaptive. Generally, an adaptive threshold level is used in NLP, because with this method, the near-end 12 speech is cut off subjectively less during double speech than with a fixed NLP threshold level. The highest momentary levels of the residual echo y(n)-y'(n) can also simultaneously be eliminated. Several methods for defining an adaptive threshold level for NLP are known in the field. In U.S. Pat. No. 3,894,200, the threshold level is based on the energy of the far-end signal x(n) in such a manner that the threshold level of NLP is 30 dB lower than the energy level of the signal x(n). In U.S. Pat. No. 4,679,230, the threshold level is determined on the basis of the attenuation achieved by an adaptive filter. If the attenuation is high enough (over 12 dB), it is probable that the signal e(n) only contains a residual echo of the far-end 13 speech. In such a case, NLP can be switched on by setting the threshold level approximately 7 dB lower than the energy level of Sin. If the attenuation achieved by the filter is low (less than 12 dB), the situation is interpreted as near-end 12 speech or double and NLP is switched off. A third method of defining the adaptive threshold level of NLP is disclosed in U.S. Pat. No. 5,274,705. In this method, the threshold level of NLP is set on the basis of the energy of the echo estimate y'(n) in such a manner that the threshold level of NLP is 16 dB lower than the energy level of the echo estimate y'(n).

Modulation of near-end 12 noise caused by the switching on and off of NLP can be reduced with the comfort noise generator 16. Especially, if there is a loud background noise at the near end 12, the switching on of NLP prevents the near-end background noise from being heart at the far end 13 when the far end is speaking. This is often subjectively experienced as interference. Therefore, comfort noise generation is generally always used in connection with NLP when NLP is active. Typically, in comfort noise generation, a noise estimate is made for the near-end 12 noise by calculating a power level for the signal e(n) with a relatively long integration time. The output level of the comfort noise generator 16 is then set to correspond to the level of the noise estimate. The spectrum of the generated comfort noise can be static noise (white noise or modified static noise). Examples of comfort noise implemented as static noise are disclosed in U.S. Pat. Nos. 4,645,883 and 5,283,748. To make the comfort noise better correspond to the different operating environments of the near end 12, not only the comfort noise level, but also the spectrum should adapt to correspond to the near-end background noise. One such method for generating comfort noise, in which both the level and the spectrum adapt, is disclosed in an earlier International Patent Application PCT/F196/00340 of the inventor. In addition, U.S. Pat. No. 5,274,705 discloses a method with which the generation of comfort noise can be entirely avoided with NLP is active. In the method, two threshold levels as used for NLP. The higher threshold level is based on the energy level of the echo estimate y'(n) and the lower threshold level is based on the energy level of the noise estimate of the signal e(n). The principle is that signal values of e(n) lower than the lower threshold level are let through NLP. The signal values between the lower and higher threshold level are attenuated to the level of the lower threshold level. In such a case, the near-end 12 noise is let through, but any levels of residual echo higher than the near-end noise are attenuated, whereby the subjective interference of the residual echo is reduced. International Patent PCT/US96/00391 also discloses a method based on partial bands of this principle of two threshold levels.

An echo canceller 11 of the invention uses the decoder 211 which corresponds to the decoder 208 in operation. A primary requirement for the decoder 211 is that it is bit-exact with the decoder 208. This means that any bit sequence fed into the input of encoder 207 produced mutually equal bit sequences as output from the decoders 208 and 211. Thus, the signal from the output of the decoder 211 is equal to the output of the decoder 208 as long as the delay τr in block 213 and the delay Ts defined earlier is compensated in delay line 212. On the basis of this, it can be said that the non-linear distortion d1(n) caused by the speech codec 207, 208 can be fully compensated in the input of the adaptive filter 15. In addition, the non-linear distortion caused by speech coding on the echo path can be fully compensated if no speech coding is used between the near end 12 and the input Sin of the echo canceller. If speech coding is used in both transmission directions, the non-linear distortion H*d1(n-Ts)+d2(n) caused by the tandem coding of the echo signal can be reduced to the value d2, where H is the transfer function of the echo source 14. In other words, the impact of the distortion component d1 caused by the speech codec 207, 208 on the non-linearity on the echo path can be eliminated. This reduction achieved in the distortion level is directly proportional to the reduction in the level of residual echo as long as other interfering factors (near-end speech, transmission errors, line noise, and near-end background noise) remain reasonably low. To minimize the impact of other interfering factors, known methods should be used to prevent an update of the tap coefficients of the adaptive filter 15, when the level of the interfering signal s(n) suddenly increases. Bit-exact operation is required of many speech codecs, which means that the circuit arrangement of the invention can be applied to several speech coding methods.

In addition, a delay line 212 can be used in an echo canceller 11 of the invention to compensate for the fixed transmission delays on the echo path generated in blocks 208 (delay τd), 209 (delay τe), and 210 (delay τd). In certain cases, it is also possible to know in advance the delays generated in the transmission blocks 213 (delay τr) and 214 (delay τs). For instance, in digital mobile networks, the interleaving and channel coding of the radio interface causes an additional fixed delay. A satellite link also causes an additional fixed delay. Delay block 212 provides the advantage that the adaptive filter 15 can be made shorter to correspond only to a possible call-spefic delay variation at the near end and a dispersion in the length of the acoustic echo. In such a case, the calculatory complexity and memory requirement of the adaptive filter can be reduced. In the circuit arrangement of FIG. 2, the optimum length T of the delay line 212 is τr+τe+τs+τd, if the delays in blocks 213, 209, 214, and 210 are fixed. If the transmission delays are not known in advance, a delay line of varying length can alternatively be used. In this case, any known delay search method can be used to estimate the length of the echo path, for instance calculating cross-correlations for the signals Rin and Sin and thus determining an optimum length for the delay line 212 per call.

The circuit arrangement of the invention provides another significant advantage in that signal samples x(n) can be stored in the memory of the delay line 212 in compressed format. As a result of this, considerably less memory is required. In known windowed echo cancellation methods based on a transfer register, the signal samples x(n) are typically saved with 8 kHz sample frequency in the memory of the delay line in a 16-bit linear PCM format. However, in the method of the invention, the memory requirement is only ⅛ for G.728 16 kbit/s codec and 1/16 for G.729 8 kbit/s codec as compared with the 16-bit linear format. With the commonly used G.721 32 kbit/s ADPCM codec, the memory requirement of the delay line is reduced to ¼.

One possible implementation for the circuit arrangement in FIG. 2 is to integrate the speech coding functions of blocks 207 and 210 and the echo canceller 11 of the invention into one functional equity. Typically, this kind of solution could be implemented in a speech codec based on DSP, for example a transcoder of a digital mobile system. This way, the compressed output of the encoder 207 is immediately available to the echo canceller 11. In addition, the same program blocks can be used in the decoder 211 as in decoder 210. Thus, the total memory requirement of DSP can be reduced. In addition, it is possible to utilize page information in speech frames in several digital transmission systems (e.g. mobile systems) to indicate whether the speech frame received by the decoder 210 is error-free or corrupted (Bad Frame Indication, BFI). If the speech frame received by the decoder 210 is corrupted, the decoder typically repeats or attenuates the previous error-free frame. In the base, the impulse response model of the echo path of the adaptive filter 15 usually breaks up. This can simply be avoided by preventing the update of the tap coefficients of the adaptive filter 15, if a corrupted speech frame is detected in the decoder 210.

Figure 3:
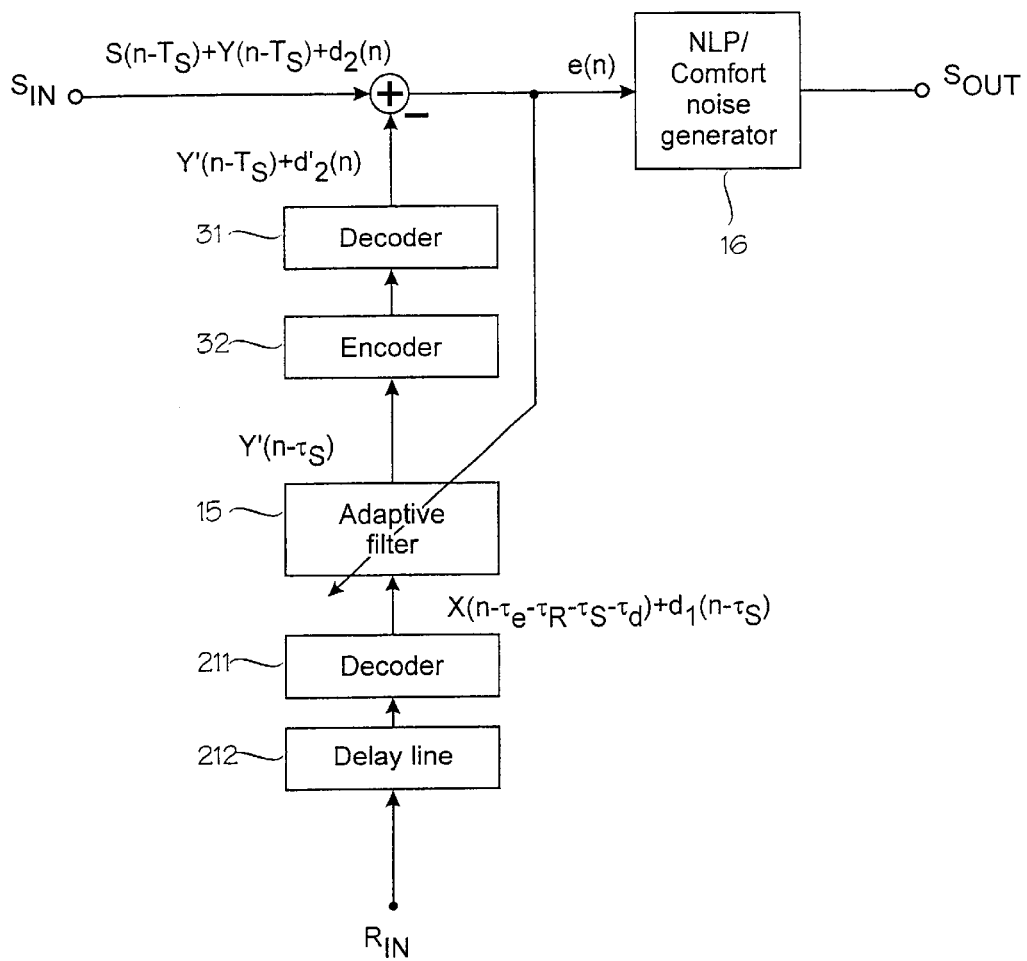
FIG. 3 shows a block diagram of an echo cancellation of a second embodiment of the invention.

FIG. 3 shows an alternative circuit arrangement of the invention. If speech coding is used in both transmission directions, the circuit arrangement of FIG. 2 can only compensate for the impact of the non-linear distortion d1 caused by the first speech codec 207, 208. The non-linear distortion d2 of the second speech codec 209, 210 remains uncompensated. An effort is made to model the distortion component D2 in blocks 31 and 32 in FIG. 3. In addition, the delay line 212 and decoder 211 of the first embodiment of the invention are used to compensate for the distortion component d1. The delay line 212 should be shorter than in the circuit arrangement in FIG. 2, because an additional delay τe+τd is generated in blocks 32 and 31. The length of the required delay line is thus τr+τs, i.e. the delay caused by blocks 213 and 214.

The encoder 32 and decoder 31 can be implemented bit-exact as compared to the encoder 209 and decoder 210 of FIG. 2, if a bit-exact speech coding method is used. Modelling the transfer function H of the echo source 14 remains a problem. To fully compensate for the impact of distortion component d2 in the residual echo y(n-Ts)+d2(n)-y'(n-Ts), the signals in the inputs of the encoders 32 and 209 should be bit-exactly the same. In practice, this is, however, not possible, because the echo path has non-linearities caused by D/A and A/D conversions, the echo source, and near-end noise. Therefore, the only possibility is to estimate the input signals of the encoders 32 and 209 to be as close together as possible by means of the adaptive filter 15. An echo estimate y'(n-τs) is obtained from the output of the adaptive filter 15, and it is run through the encoder 32 and decoder 31, whereby an echo estimate y'(n-Ts)+d2'(n) is obtained, which includes an estimate of the distortion component d2. If the other non-linearities on the echo path are small as compared with d2, the echo source 14 can be modelled exactly enough with the adapter filter 15 and thus, the echo signal y(n-Ts)+d2(n) and the echo estimate y'(n-Ts)+d2'(n) correlate sufficiently with each other, whereby the residual echo {y(n-Ts)+d2(n)}−{y'(n-Ts)+d2'(n)} also decreases as compared with the circuit arrangement in FIG. 2.

Another problem with the circuit management in FIG. 3 is the increase in calculatory complexity, because an echo canceller would need one encoder and two decoders. The required amount of memory can be reduced by integrating the echo canceller in FIG. 3 into a transcoder, for instance, whereby the same program blocks can be used in speech coding and in the speech codecs of the echo canceller. The calculatory complexity can also be reduced, if the speech coding method is based on an analysis-synthesis method in which a local decoder is used in the encoder to generate synthesized speech. The locally decoded speech is subtracted from the original uncompressed speech and the obtained difference signal is used in the search for the optimum excitation signal of the encoder. An example of an analysis-synthesis method are the CELP speech coding methods (Code Exited Linear Prediction). This way, instead of speech parameters, the output of the encoder 32 would be a signal decoded locally in the encoder 32, and a separate decoder 31 would not be needed. The end result would be that only one encoder and decoder is needed in the echo canceller of FIG. 3.

The problem with the circuit arrangement of FIG. 3 was that the adaptive filter 15 could not model non-linearities caused by D/A and A/D conversions, the echo source 14, and near-end 12 noise. Because of this, it is possible that the residual echo is not weaker than that of the echo canceller in FIG. 2. The residual echo may even be stronger. One solution to this problem is illustrated in the circuit arrangement of FIG. 4. The solution is based on two parallel adaptive filters, of which the first filter 15 is connected as in FIG. 2 and the second filter 47 is connected as in FIG. 3, whereby an encoder 46 and decoder 45 are connected to the output of the filter 47. The idea is that the residual echo signal (e1(n) or e2(n)) with a lower level is selected for the input of NLP 16 in the selector 49. The switching can even be made based on each sample, because the interfering sounds caused by the switching are eliminated in NLP. Alternatively, it is possible to calculate the power estimates of signals e1(n) and e2(n) using a suitable integration period and make the switching decision based on this. However, the connection should not be changed during double speech due to switching interference. In addition, if a shortest possible filter is to be used in block 15, the delay line 42 can be used to compensate for the delays $\tau e + \tau d$ caused by the encoder 209 and the decoder 210. In the delay line 42, the samples are in uncompressed format, but in the delay line 212, the samples are in compressed format.

Figure 4:
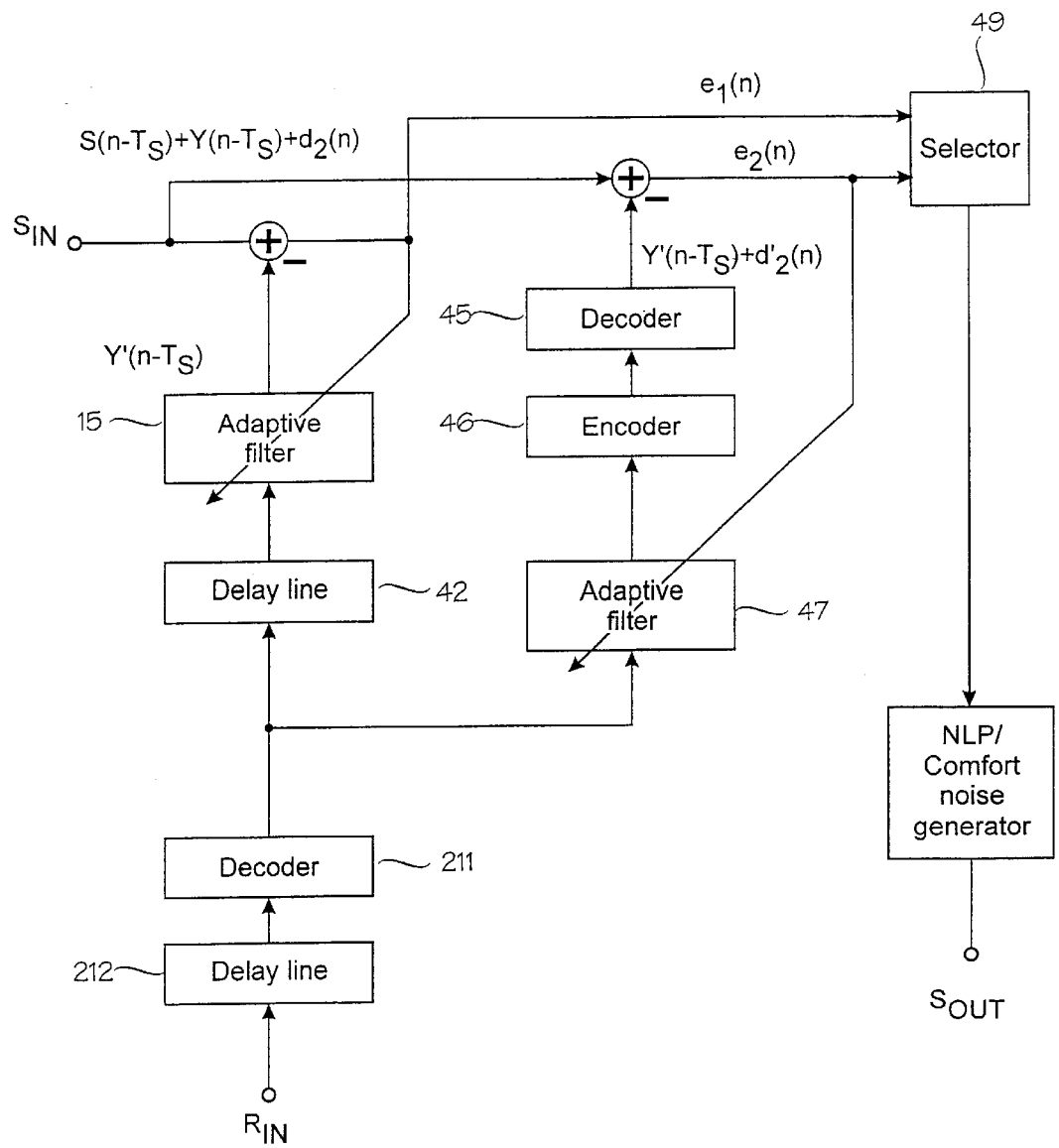
FIG. 4 shows a block diagram of an echo canceller of a third embodiment of the invention.
Figure 5:
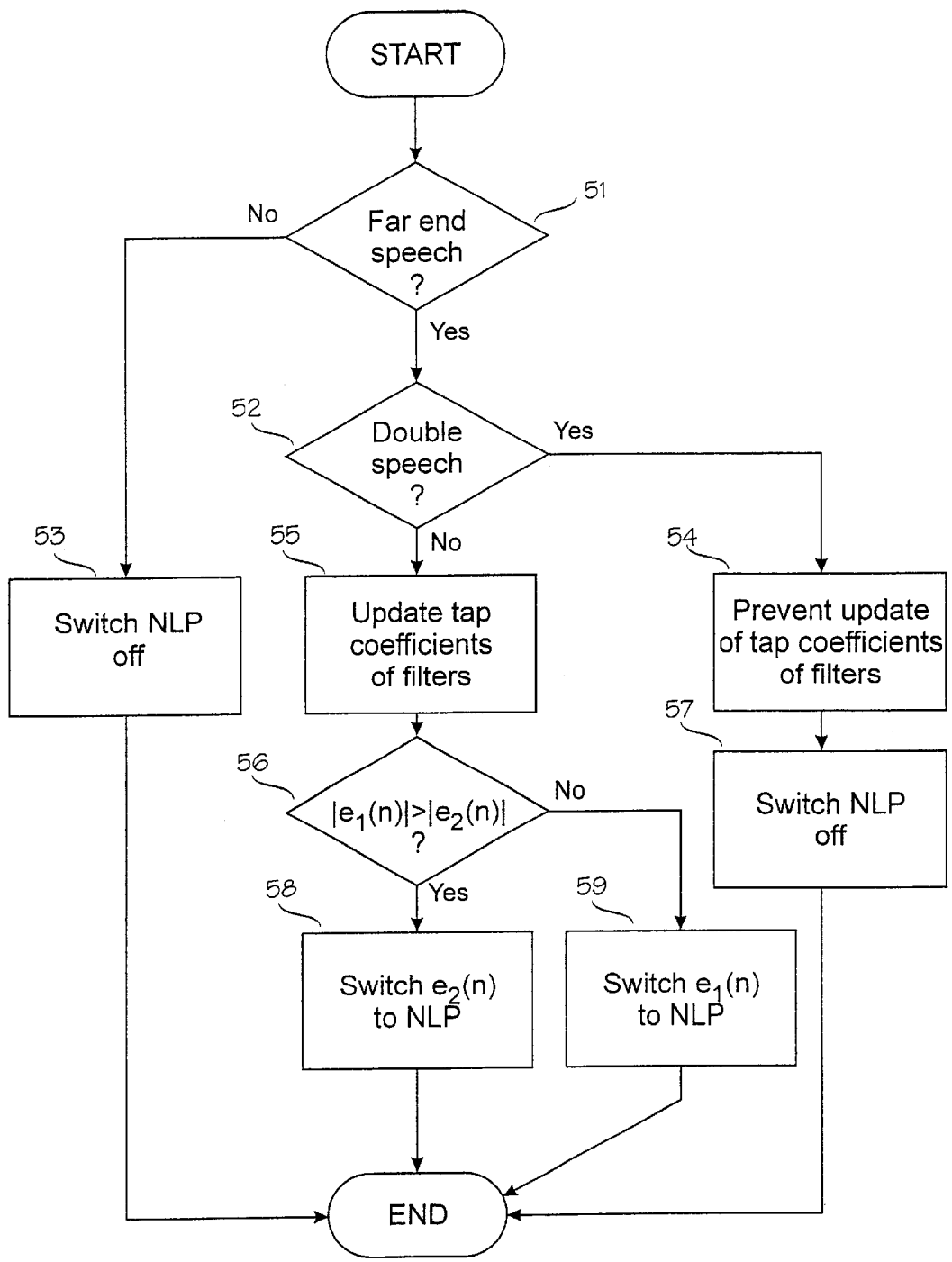
FIG. 5 shows a flow chart illustrating the operation of the echo canceller in FIG. 4.

FIG. 5 shows an example a flowchart of the circuit arrangement in FIG. 4. The operation is essentially as follows: a check is made in step 51 to see if there is ongoing far-end 13 speech. If there is no speech, i.e. the echo originating from the near end 12 need not be cancelled, NLP 16 is switched off. If there is ongoing far-end speech, a check is made in step 52 to see if there is double speech. If there is double speech, updating of the tap coefficients of the filters 15 and 47 is prevented (step 54) so that the impulse response model does not break up when the near-end 12 signal s(n) suddenly increases, and NLP 16 is switched off (step 57) to avoid near-end speech from cutting off. If there is no double speech, only far-end 13 speech, the tap coefficients of filters 15 and 47 are updated in step 55. After this, in step 56, the levels of the residual echo signals e1(n) and e2(n) produced by the parallel filter branches are compared with each other. If the level of the signal e1(n) is higher than the signal e2(n), e2(n) is connected to NLP 16 (step 58). Otherwise, the signal e1(n) is connected to NLP (step 59).

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for echo cancellation in a digital data transmission system in which system the end of a transmission link to which sound returns as an echo is the far end and the end of transmission link from which an echo is reflected back is the near end, and in which a speech coding method is used on the echo path at least for a far-end signal transmitted from the far end to the near end, the method comprising:

decoding the far-end speech-encoded signal with a speech decoder located on the far-end side of the transmission link;

estimating the echo originating from the near end using an adaptive linear filter based on the decoded far-end signal; and subtracting the echo estimate from the near-end signal transmitted from the near end to the far end.

2. The method of claim 1, further comprising:

delaying the input or out signal of the adaptive linear filter to compensate for the transmission delays on the echo path.

3. The method of claim 2, further comprising:

delaying said input signal of the adaptive linear filter before the signal is decoded in the speech decoder.

4. The method of claim 1, further comprising:

cancelling residual echo with a non-linear processor or comfort noise generator from the signal coming from the near end, from which signal the echo estimate produced by the adaptive linear filter has already been subtracted.

5. The method of claim 1, further comprising encoding and decoding the echo estimate produced by the adaptive linear filter, before it is subtracted from the near-end signal, to compensate for the non-linear distortion caused by speech coding performed on the near-end signal on the echo path.

6. The method of claim 1, further comprising:

feeding said decoded signal also to a second adaptive linear filter parallel to said adaptive linear filter;

encoding and decoding the output signal of the second adaptive linear filter, subtracting the thus obtained second echo estimate from the signal to be transmitted from the near end to the far end, and selecting either the near-end signal, from which the first echo estimate has been subtracted, or the near-end signal, from which the second echo estimate has been subtracted, for transmitting on to the far end.

7. The method of claim 6, further comprising selecting the signal whose lever is lower.

8. The method of claim 6, further comprising delaying the input or output signal of the first adaptive linear filter to compensate for the delay caused by the encoding and decoding in the second filter branch.

9. The method of claim 6, further comprising cancelling the residual echo from the selected signal with a non-linear processor/comfort noise generator.

10. An apparatus for echo cancellation in a digital data transmission system in which system the end of a transmission link to which sound returns as an echo is the far end and the end of the transmission link from which an echo is reflected back is the near end, and in which a speech coding method is used on the echo path at least for a far-end signal transmitted from the far end to the near end, the apparatus comprising:

an adaptive linear filter, which is located on the far-end side of the transmission link, and configured to produce an echo estimate based on the far-end signal and subtract the echo estimate from the signal coming from the near end to cancel the echo originating from the near end; and a speech decoder which is located on the far-end side of the transmission link and configured to decode the speech-encoded far-end signal and forward the decoded far-end signal to the adaptive linear filter for the purpose of producing an echo estimate.

11. The apparatus of claim 10, wherein the decoder is bit-exact with the decoder used in speech coding the far-end signal on the echo path.

12. The apparatus of claim 10, further comprising a non-linear processor or noise generator configured to cancel residual echo from the signal coming from the near end, from which signal, the echo estimate produced by the adaptive linear filter has already been subtracted.

13. The apparatus of claim 10, further comprising a delay line configured to delay the input or output signal of the adaptive linear filter to compensate for the transmission delays on the echo path.

14. The apparatus of claim 13, wherein the delay line is configured to cause a delay whose length is $\tau r+\tau e+\tau s+\tau d$, where:

$\tau r$=the transmission day of the far-end signal without speech coding delays;

$\tau e$=the encoder delay;

$\tau s$=the transmission delay of the near-end signal without speech coding delays; and $\tau d$=the decoder delay.

15. The apparatus of claim 10, further comprising an encoder and a second decoder configured to encode and decode the output signal of the adaptive linear filter, before the output signal is subtracted from the near-end signal transmitted from the near end to the far end, to compensate for the non-linear distortion caused by the speech coding performed on the echo path on the near-end signal.

16. The apparatus of claim 15, wherein the encoder and second decoder are bit-exact with the encoder and, correspondingly, the decoder used in speech coding the near-end signal on the echo path.

17. The apparatus of claim 10, further comprising:

an addition to said adaptive linear filter, a second adaptive linear filter parallel to adaptive linear filter, an encoder and a second decoder for encoding and decoding the output signal of the second adaptive linear filter, after which the thus obtained second echo estimate is subtracted from the near-end signal, and a selector member configured to select either the near-end signal, from which the first echo estimate has been subtracted, or the near-end signal, from which the second echo estimate has been subtracted, and transmits it on to the far end.

18. The apparatus of claim 17, wherein the encoder and the second decoder are bit-exact with the encoder and, correspondingly, the decoder used in speech coding the near-end signal on the echo path.

19. The apparatus of claim 17, wherein the selector member is configured to select the signal whose level is lower.

20. The apparatus of claim 17, wherein the apparatus also comprises a non-linear processor/comfort noise generator configured to cancel residual echo from the signal selected by the selector member.

21. The apparatus of claim 17, further comprising a delay line configured to delay the input or output signal of the first adaptive linear filter to compensate for the delay caused by the encoding and decoding in the second filter branch.

22. The apparatus of claim 21, wherein the delay line, which delays the input or output signal of the first adaptive linear filter to compensate for the delay caused by the encoding and decoding in the second filter branch, is configured to cause a delay whose length is $\tau e+\tau d$, where:

$\tau e$=the encode delay; and $\tau d$=the decoder delay.

23. The apparatus of claim 15, further comprising a delay line configured to delay the input signal of the first and the second adaptive linear filter to compensate for the transmission delays on the echo path.

24. The apparatus of claim 23, wherein the delay line, which delays the input signal of the first and the second adaptive linear filter to compensate for the transmission delays on the echo path, is configured to cause a delay whose length is $\tau r+\tau s$, where:

$\tau r$=the transmission delay of the far-end signal without speech coding delays; and $\tau s$=the transmission delay of the near-end signal without speech coding delays.

* * * * *